Aug. 15, 1972    W. B. GOLDSWORTHY    3,684,622
PULTRUSION MACHINE
Original Filed June 23, 1967    6 Sheets-Sheet 1
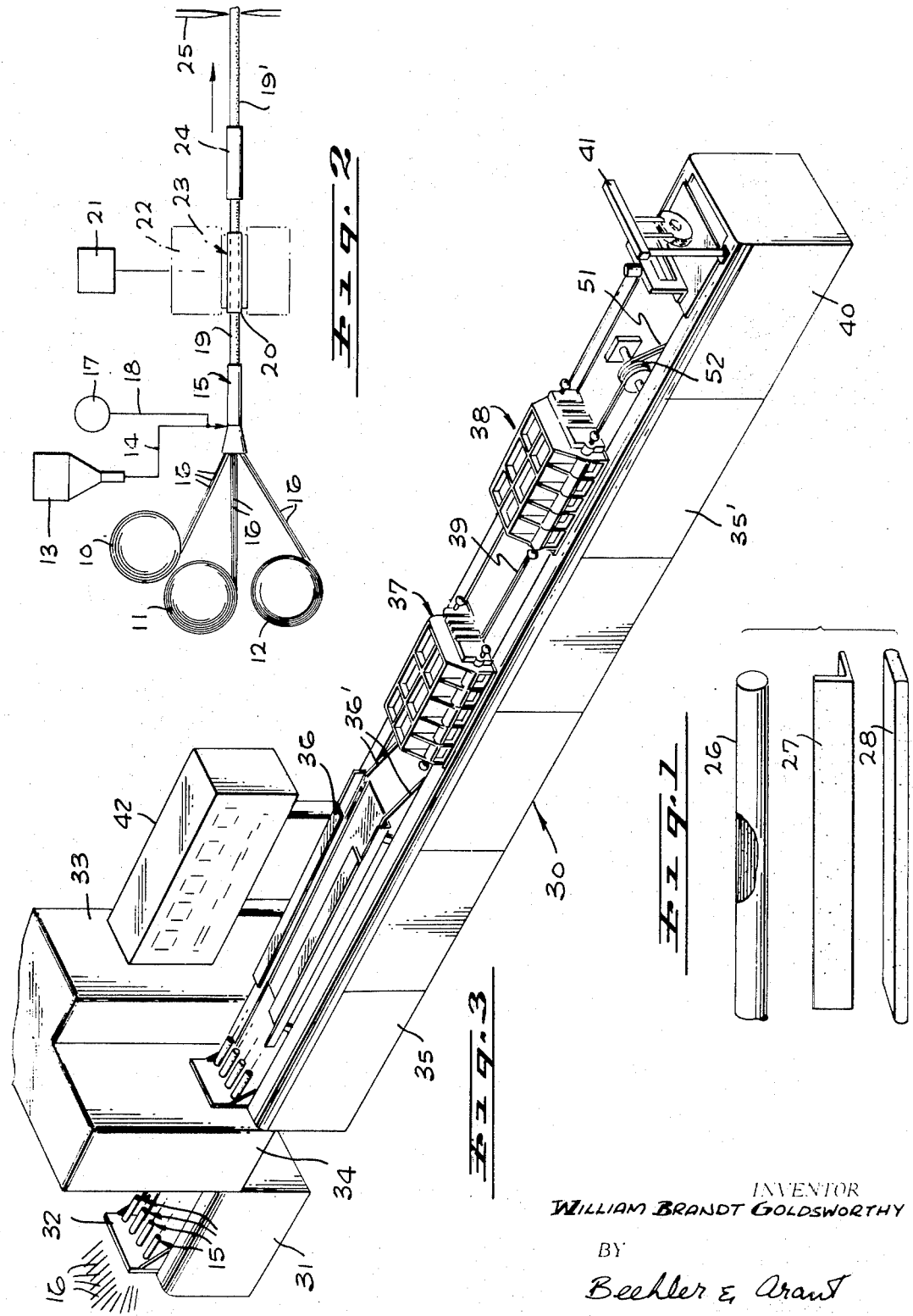
INVENTOR
WILLIAM BRANDT GOLDSWORTHY
BY
Beehler & Arant
ATTORNEYS Aug. 15, 1972  W. B. GOLDSWORTHY  3,684,622
PULTRUSION MACHINE
Original Filed June 23, 1967  6 Sheets-Sheet 2
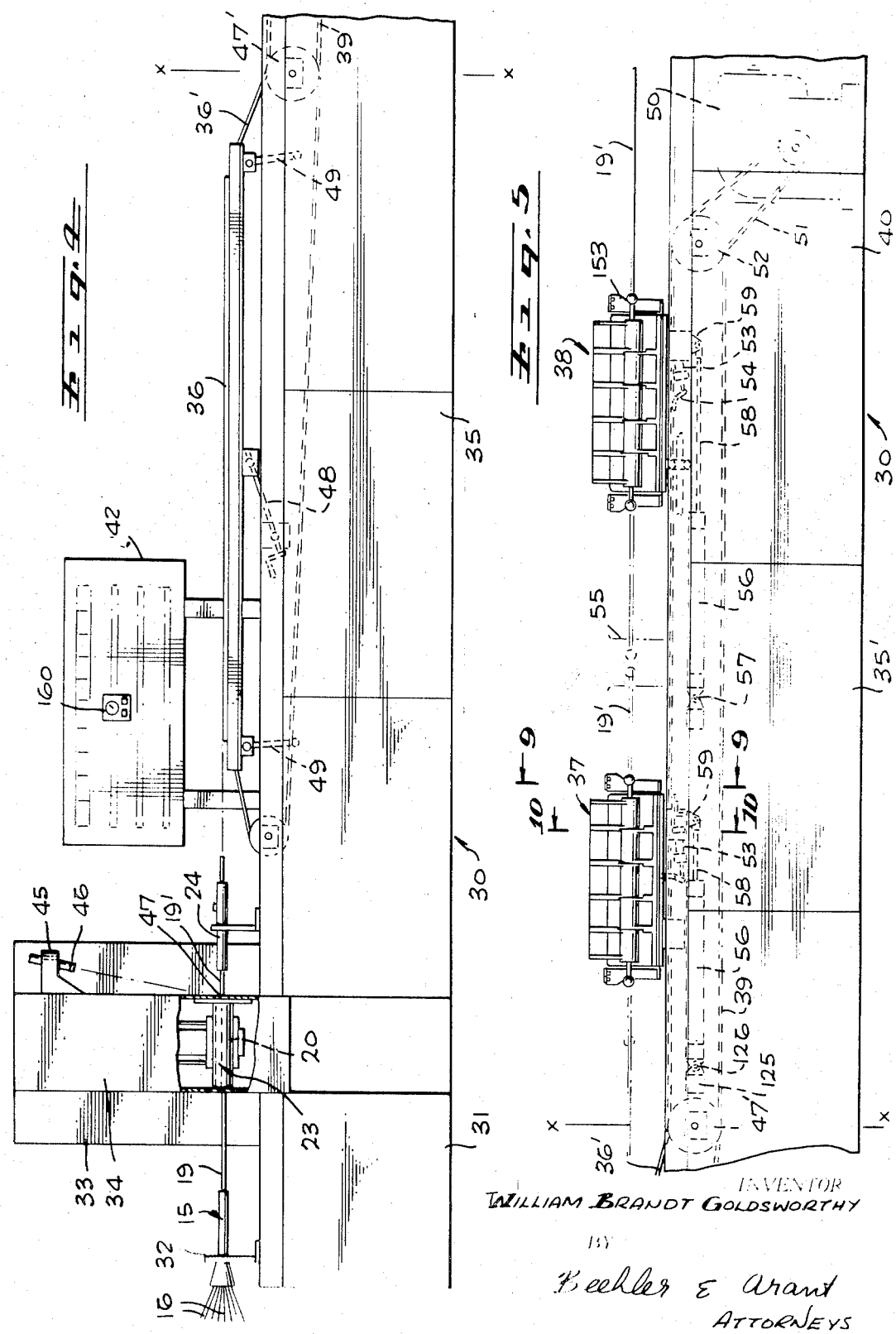
INVENTOR
WILLIAM BRANDT GOLDSWORTHY
BY
Keehler & Arant
ATTORNEYS

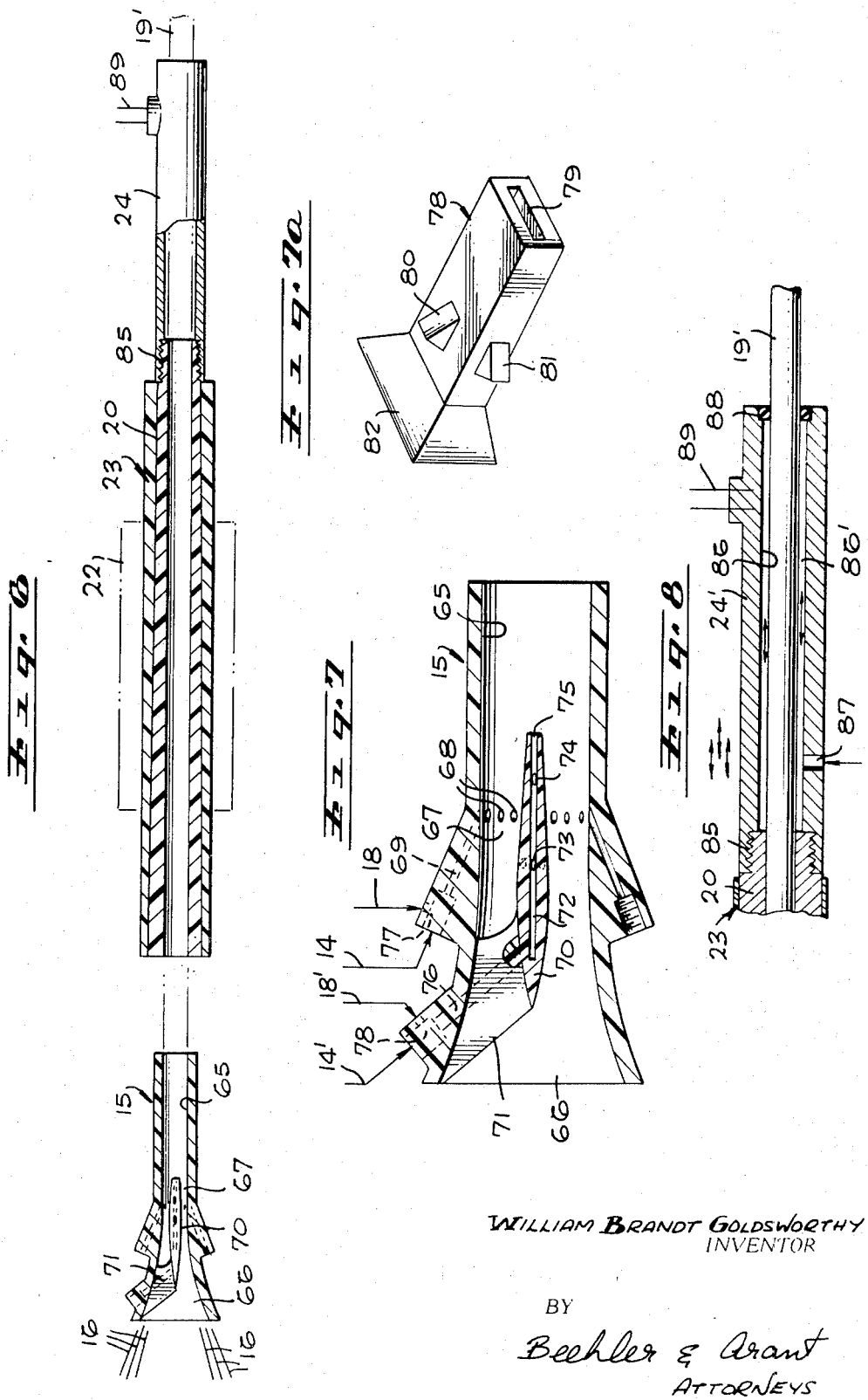

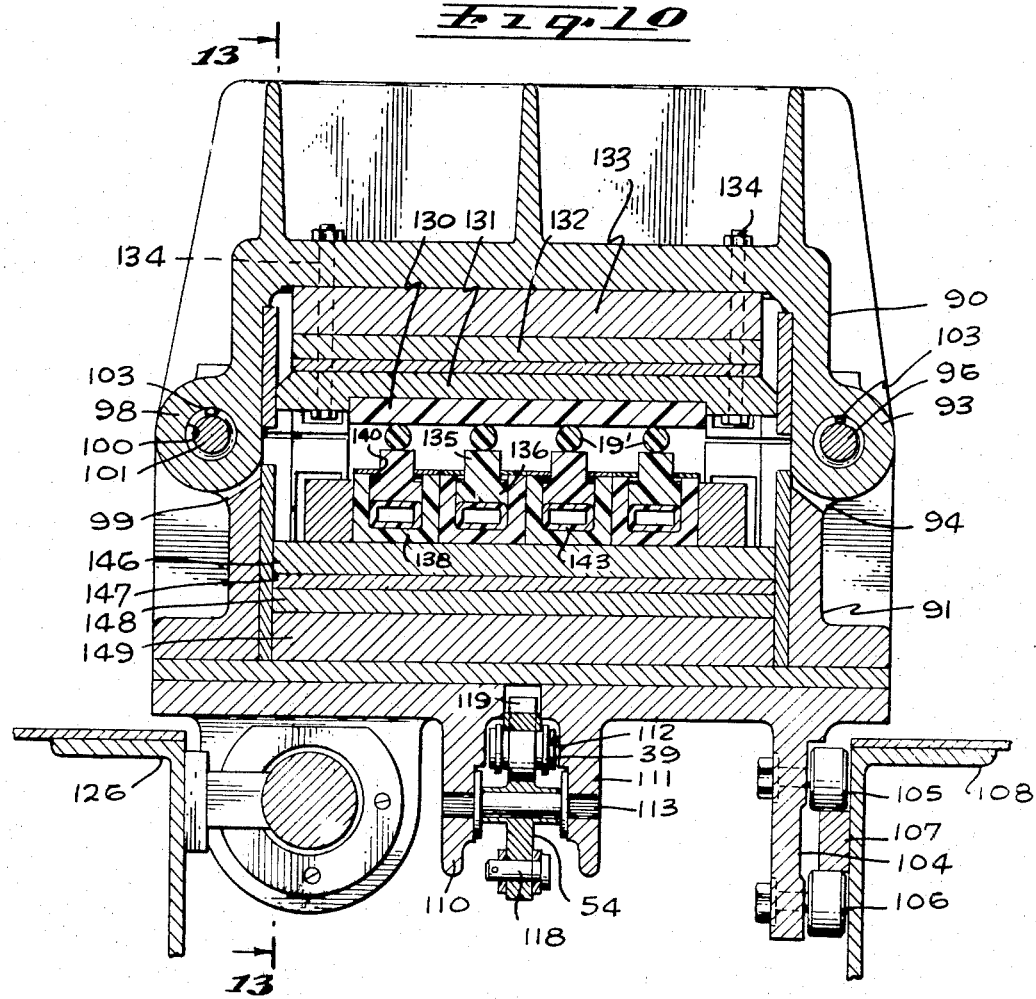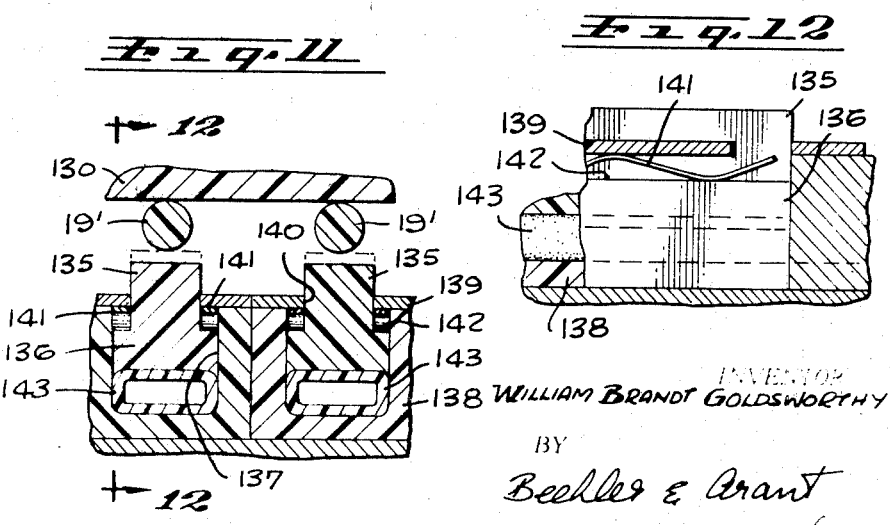

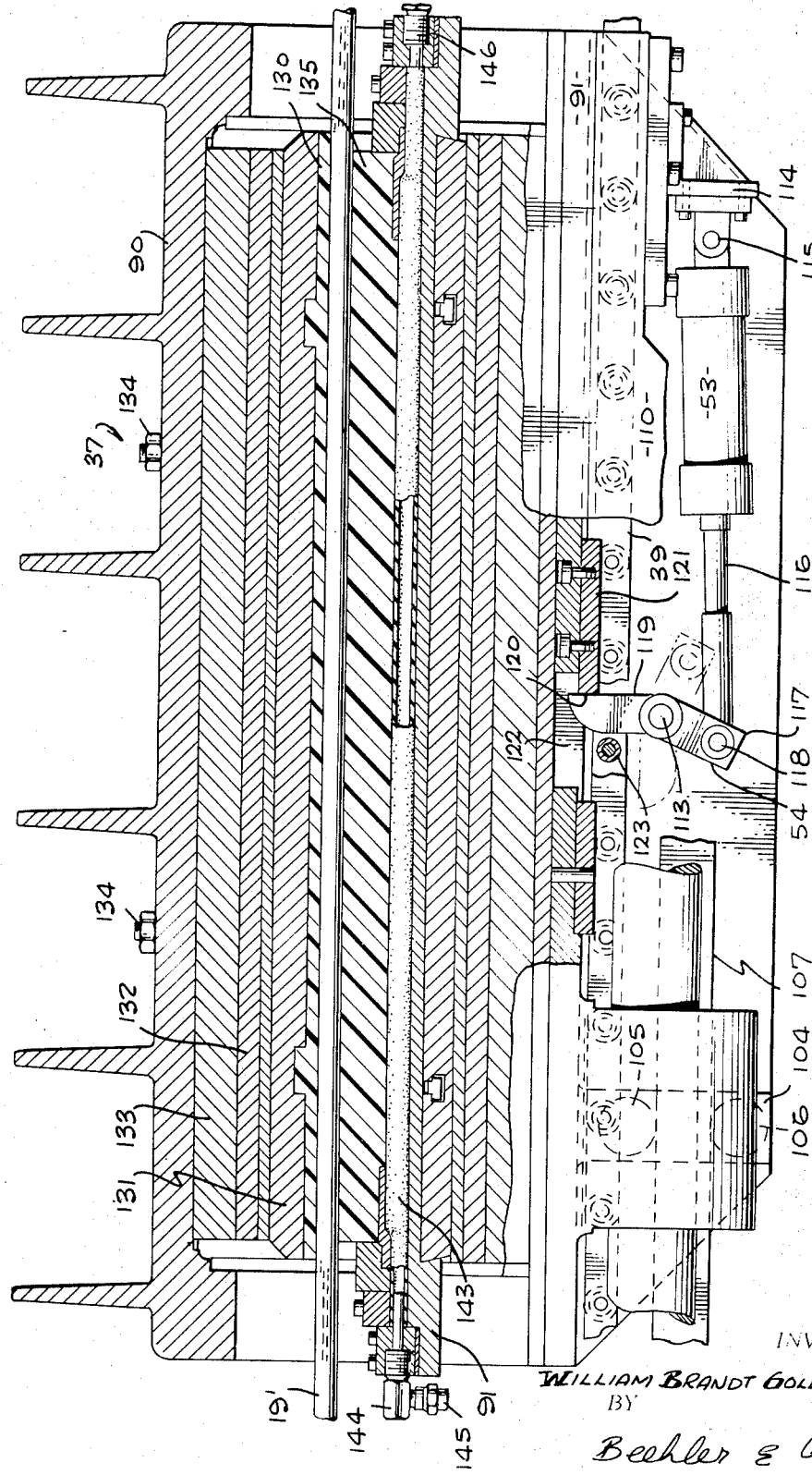

United States Patent Office 3,684,622
Patented Aug. 15, 1972

3,684,622
PULTRUSION MACHINE
William Brandt Goldsworthy, Palos Verdes Estates, Calif., assignor to Glastrusions, Inc., Torrance, Calif.
Original application June 23, 1967, Ser. No. 648,347, now Patent No. 3,556,888, dated Jan. 19, 1971. Divided and this application June 29, 1970, Ser. No. 50,831
Int. Cl. B29h 9/00
U.S. Cl. 156—441
18 Claims

ABSTRACT OF THE DISCLOSURE

The invention is embodied in a device for continuously forming stock material from a combination of filaments impregnated with synthetic thermosetting plastic resin into which an appropriate hardener is entrained, followed by what amounts to extremely rapid curing while the stock passes through a forming die through which it is pulled by a hand-over-hand type of pulling device. An impregnating or composing tube wherein the filament is impregnated with catalyzed resin, hereinafter termed a composing tube, is of such design and construction that the action assists in pushing the stock through the process providing a combined action which gives rise to the designation "pultrusion machine."

---

This is a division of copending application Ser. No. 648,347 filed June 23, 1967, now Pat. No. 3,556,888.

The over-all operation can best be envisioned from an examination of FIGS. 1 and 2 wherein there is provided a source of supply of filament which, in practice, is customarily strands of fiberglass roving coming from a multiple source, the separate strands being directed into a composing tube where they are impregnated with synthetic thermosetting plastic resin. An appropriate hardener is metered into the resin at or near the composing tube. The impregnated strands then pass immediately to a forming die wherein they are subjected to a rapid cure by application of wave energy, such as radio frequency waves. Pullers engage the cured stock after it emerges from the forming dies and draw it to a cut-off point. Assisting in the passage of the stock through the forming dies is an ultrasonic generator which imparts longitudinal wave energy to the forming dies as the stock passes through. As the strands are pulled into the composing tube, they are wetted by the resin and compacted so that the combination of filament and resin is densely compacted upon emergence from the composing tube, the proportion being about 80% filament to about 20% resin.

RESUME OF DEVELOPMENT

The pultrusion device incorporates a large number of improvements in the machine which are a noteworthy advance over the art taught in U.S. Pats. Nos. 2,871,911 and 2,990,091. The machine is primarily built around the use of radio frequency heating as a means of producing extremely rapid cures in the fiber-resin composite that is being drawn through the forming dies. It is this extremely rapid cure that permits total cure or polymerization to take place within the confines of the die tubes, thereby assuring absolute conformation to the shape and dimensional tolerances of that die tube, and also imparting a fine surface finish to the item being formed.

In the past, generators providing frequencies in the range from 13 to 50 megahertz have been used for this curing process. Experience has proven that as the frequency is increased, the capability for coupling the energy to the workload increases. In addition, certain desirable resin matrix systems having a lower electrical loss tangent in their monomeric forms are difficult to heat efficiently at the lower frequencies. Thus the use of higher frequency energy results not only in a much more efficient usage of the basic heating medium, but also increases the scope of raw materials that are practical for usage in the end product.

The actual frequencies currently preferable are in the 50 to 100 megahertz range in the radio frequency band, and in the 950 to 5200 megahertz rang in the microwave band.

These changes in frequency bring about some basic changes in the electrode assembly, through which the energy is delivered to the material. A much higher degree of surface conductivity area is required, and some cooling means should be provided for energy dissipation in the microwave frequency range.

The method of coupling the energy to the workload takes on a completely different form. In the radio frequency range (13 to 100 megahertz), the electrode generally takes the form of one electrode serving as the hot potential and the other serving as the ground potential. These may be arranged as parallel plates, coaxial tubes, alternating parallel rods, or alternating rings disposed about the die tube. In the microwave range (950 megahertz to 5200 megahertz), the die tube is introduced into a wave guide or reflective cavity depending upon the relationship of the product's physical dimensions to the frequency being utilized.

The choice of whether to use radio frequency or microwave frequencies relates to the resin system that will be used predominantly in the end product, and to some degree to the geometrical cross-section of the desired end product. Examples of the success of the frequency increase approach are demonstrated by the fact that running rates for any given product mentioned, in a glass-polyester combination, have been more than tripled. With the microwave frequencies, normal epoxy resins, which have run extremely slowly in the 13 to 50 megahertz range, now attain high satisfactory running rates in the 950 to 5200 megahertz range.

As running rates increase, a new problem has been introduced into the pultrusion process. This is the tensile load that is introduced into the end product stream due to viscous drag in the resin impregnating system. This load increases exponentially as the pull-through speed increases and is, of course, also a function of the viscosity of the resin. As these tensile loads increase, it becomes more and more difficult to provide a pulling device in which there is no slipping nor marring of the surface of the end product as it is being withdrawn. Puller slippage is extremely critical in this process, as it provides the primary quality control technique available.

To alleviate this problem, there has been developed an impregnating head to take the place of the impregnating tank and squeeze-out bushings or rolls as formerly practiced. In this head the dry fibers are introduced into an annular orifice having a shape similar to that of a venturi tube. Resin is introduced through a multiplicity of holes or slots around the inner and outer periphery of the narrow throat of this orifice, under pressure, sufficient to exert an extruding effect upon the fiber resin composite in the downstream direction of the process. Thus, rather than acting as a drag against the puller in the processing line, as has been the case heretofore where use was made of a tank, with stripping bushing or rolls, the impregnating head actually imparts velocity to the raw material in the direction of the puller, thereby decreasing the load. Resin pressure can of course be regulated to insure that some tension always remains in the system so that the roving strands are pretensioned during the curing process.

The second advantage that is obtained with this type of impregnating head is that the resin and catalyst, or promoter system or both, as the case may be, may be mixed in the impregnating head in a manner similar to those used for mixing catalyst-promoter-resin systems on polyurethane foaming equipment, or polyester spray-up equipment and epoxy dispensing systems.

Mixing the catalyst-promoter-resin system on demand in the impregnating head allows the use of much more reactive catalytic and promoting systems, as it eliminates any need for long-term pot life of the catalyzed resin as is required with a tank impregnating system. Use of these more reactive systems produces much more rapid cure rates and therefore, again, provides for increased running speed in the end product.

The greatest single cause for rejection and poor quality in a finished pultrusion is the phenomenon known as sloughing. This sloughing occurs when the frictional forces within the die tube shear the outer surface from the moving composite during gelation, causing pieces of cured resin to stick or adhere to the inner die tube surface, resulting in a plowing or scoring of the surface of the pultruded product as it moves through the die tube. When this occurs, the surface of the product is increasingly degraded, until it finally becomes necessary to stop the machine momentarily in order to completely cure the surface within the die tube, in order that the particles adhering to the die tube surface may be cured into the mass and withdrawn as the machine is restarted. This practice is known in the trade as "purging."

This sloughing of the product results in a relatively high percentage of scrap loss and second grade material, and the necessity of purging both subtracts from the output rate and adds to the difficulty of over-all control. In order to eliminate this sloughing problem, there is disclosed a device for vibrating the die tube along its longitudinal axis at ultrasonic frequencies. This ultrasonic vibration in the longitudinal direction prevents the formation of a bond during gelation at the die tube resin interface. This stock may be run indefinitely with no deterioration of surface quality or physical tolerances other than those brought about by normal die tube wear. The practice of purging is also, of course, completely eliminated.

A secondary advantage that accrues through the use of the ultrasonically vibrated die tube is the more thorough wetting of the reinforcing fiber by the resin matrix, and the greater degree of elimination of both entrained and dissolved air due to bubble cavitation at the entry end of the die tube.

As mentioned earlier in this discussion, control of the pulling speed of the finished stock through the process is all-important if maximum quality and production rates are to be obtained. It is obvious, then, that if puller drive speeds are not absolutely constant and/or slippage occurs between the product and the puller itself, control of the product is essentially lost.

To eliminate these problems, two basic improvements have been made. The first is the design of a puller, which operates on the hand-over-hand or reciprocating principle, where two heads alternately grip and release to provide continuous motion. The broad principle was used in the pulling device outlined in U.S. Pat. No. 2,990,091. In place of a cam-operated, taper block gripping device unit, as therein disclosed, the present disclosure features a puller which grips the stock hydraulically over a very large surface area, insuring zero slip even under extremely high tensile loads. Distributing the pressure through an elastomeric medium over the large area made possible by this development permits reduction of unit pressure, and therefore minimizes the possibility of damaging the surface finish of the stock, or fracturing or collapsing hollow or fragile sections that might be pulled.

Gripping is achieved by pressurizing a tube which is contained in an elongated cavity, such that it has support on five sides of the cavity and reacts against a floating elastomeric gripping block on the sixth side. This provides an extremely versatile gripping unit, as the pressure may be finally adjusted to achieve just the right amount of gripping load required for any specific cross-sectional shape. The release and grip cycling is controlled by electronic means.

The reciprocation of the two gripping heads is provided by cyclically clamping the gripping head to a constantly moving chain and releasing it therefrom, with the heads being returned to the new gripping position by means of a hydraulic cylinder. Proper cycling of these gripper heads, in order to provide continuous motion, is provided by electronic sequencing.

The hydraulic gripping heads described above provide for the elimination of slippage, and in order to assure absolutely constant speed at any given setting on the control panel, the puller is driven by a hydraulic motor equipped with a servo valve and a closed-loop system. This closed-loop system provides constant velocity feed-back information, which is compared with the preset velocity requirements and constantly corrects the drive velocity to meet these requirements.

To insure optimum running speeds, as well as continuous quality control, there has been developed in cooperation with the device an automatic monitoring system to feed information into the closed-loop velocity control just described. This consists of an optical pyrometer which precisely monitors the stock temperature as it exits from the die tube. In operation, the optimum exit temperature for any given profile is determined, and this temperature is set at the control panel into the automatic optical pyrometer system. The optical pyrometer monitors this preset temperature and compares it with the actual exit temperature of the stock.

If the actual exit temperature should rise, the optical pyrometer will signal the servo system to increase the puller speed, thereby shortening the time of exposure of the stock to the energy field and bringing the temperature back down to the preset temperature. If the exit temperature should drop, then the optical pyrometer will signal the servo system to decrease the speed of the puller, providing longer exposure of the stock to the energy field and therefore bringing the temperature back up to match the preset temperature. This results in quality control repeatability, as well as maximum productivity.

Among the objects of the invention is to provide a new and improved machine for continuously forming filament reinforced synthetic plastic resin stock in a rapidly acting, continuously controlled operation.

Another object of the invention is to provide a new and improved machine for the continuous production of fiberglass filament reinforced synthetic plastic resin stock material wherein passage of the material through successive forming and curing tubes is effected by a combination of pull upon the cured stock augmented by an impelling action of the forming tube.

Still another object of the invention is to provide a new and improved machine for the continuously forming of fiberglass reinforced synthetic plastic resin elongated stock material wherein the speed and quality of the resulting stock is under constant control and wherein the rate of production is appreciably accelerated by construction and operation of the composing tube, the application of standing wave energy to the forming die and curing by means of high frequency electrically generated wave energy, and wherein the pullers which attach to the finished cured stock are provided with gripping surfaces which in no way impair the finished exterior condition of the stock as it emerges from the forming die.

With these and other objects in view, the invention consists in the construction, arrangement, and combination of the various parts of the device, whereby the objects contemplated are attained, as hereinafter set forth, pointed out in the appended claims and illustrated in the accompanying drawings.

In the drawings:

FIG. 1 shows sections of a variety of different forms of stock material which the machine is capable of producing.

FIG. 2 is a schematic representation of the over-all operation.

FIG. 3 is a side perspective view of the device.

FIG. 4 is a side elevational view of the lefthand portion of the machine as viewed in FIG. 3.

FIG. 5 is a side elevational view of the righthand portion of the machine as viewed in FIG. 3, such that FIGS. 4 and 5 together provide a complete side elevational view.

FIG. 6 is a longitudinal sectional view of respectively, the composing tube, forming die, and vibrator.

FIG. 7 is a longitudinal sectional view of the composing tube drawn to larger scale.

FIG. 7a is a side perspective view of a second form of composing tube.

FIG. 8 is a longitudinal sectional view of the second form of vibrator.

FIG. 10 is a cross-sectional view on the line 10—10 of FIG. 5.

FIG. 11 is a fragmentary cross-sectional view of a portion of FIG. 10, showing the mechanism in released position.

FIG. 12 is a fragmentary longitudinal sectional view on the line 12—12 of FIG. 11.

FIG. 13 is a longitudinal sectional view on the line 13—13 of FIG. 10.

GENERAL ASSEMBLY

Figure 9:
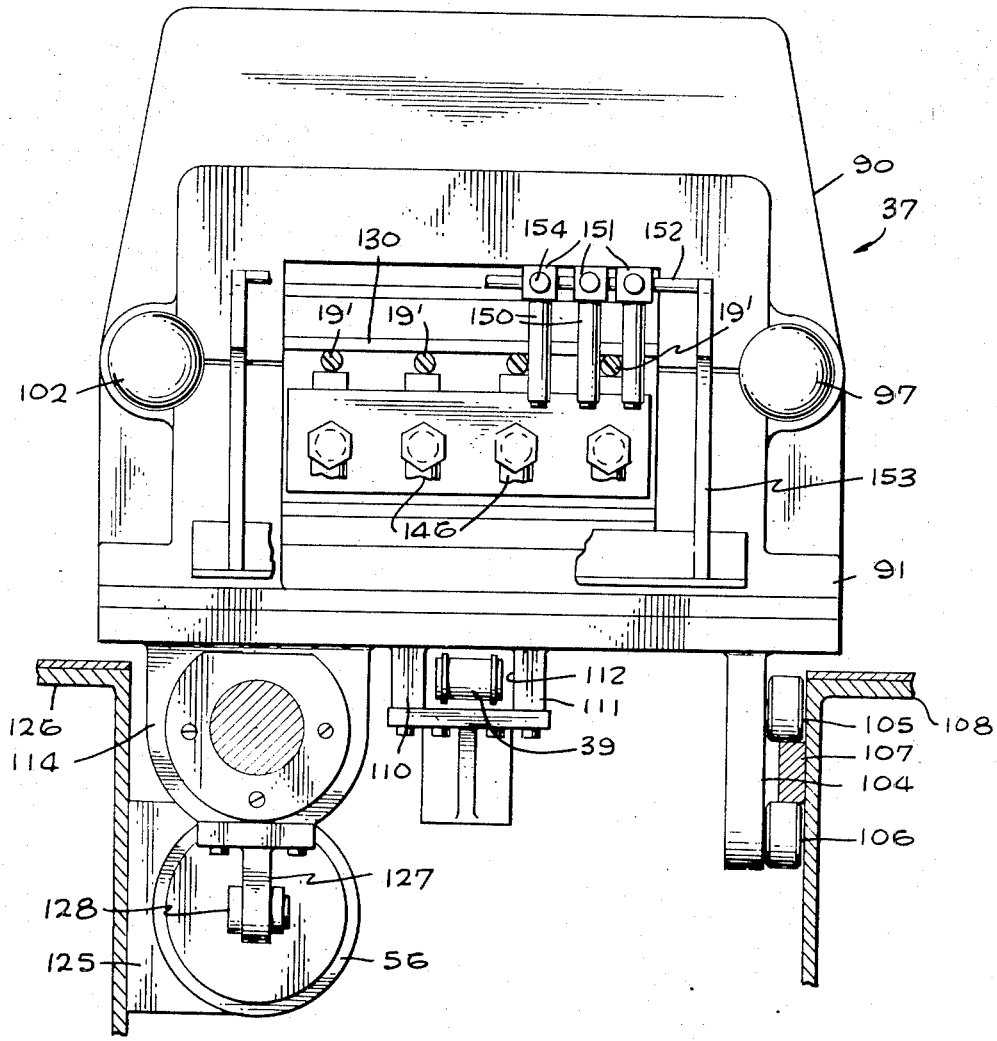
FIG. 9 is a cross-sectional view on the line 9—9 of FIG. 5.

In FIG. 2 there is shown schematically the flow of materials through the operation from the raw state to the finished stock. Spools of fiberglass roving are indicated by the reference characters 10, 11, and 12. A reservoir 13 is provided for liquid synthetic resin of a selected thermosetting type which is carried through a supply line 14 to a composing tube 15, into which a multiplicity of strands 16 are also directed. A canister 17 contains an appropriate liquid hardener for the resin which is carried through a line 18 to some point adjacent the application of resin to the composing tube. As the strands 16 pass through the composing tube, they are impregnated with resin into which liquid hardener is introduced and unhardened composite stock 19 of resin and roving passes into a forming die 20. During passage of stock through the forming die it is subjected to high frequency wave energy from a power source 21. The energy may be in the form of radio frequency energy or, in the alternative, microwave energy, which passes into a shielding chamber 22 surrounding a jacket 23 which supports the forming die 20 in the chamber 22. A vibrator, transducer or agitator 24 capable of imparting vibratory motion in the sonic or ultrasonic range, preferably in a longitudinal direction, may be located on the downstream side of the forming die and when used is preferably attached thereto. The stock at the location 19' is completely hardened by the curing effect produced by the radio frequency wave energy or microwave energy and passes to a cut-off 25 where the stock is cut to desired length.

The stock may, for example, be solid rod stock 26, angle stock 27, strip material 28, as suggested in FIG. 1, or tubing or other shapes of appreciable variety, depending upon the type of forming die employed. In accordance with the operation the stock of whatever shape or size may be chosen is completely cured in the chosen form as it emerges from the forming die.

In practice, a machine suited to the operation is embodied in an elongated frame, indicated generally by the reference character 30, wherein certain conventional apparatus at the starting or raw material end has been omitted in the interest of clarity. A portion 31 of the frame 30 supports a bank 32 of composing tubes 15, numbering 4 in the present example, at which point the strands 16 are introduced into the machine. A housing 33 for electronic apparatus, including power tubes, is located immediately downstream of the portion 31 and an extension 34 of the housing provides the chamber 22 which contains the forming dies 20.

A portion 35 of the frame comprises a special track section 36 which is used only for starting the operation with the assistance of special removable carriages (not shown).

Pulling means for pulling the stock through the process is embodied in a pair of pulling heads 37 and 38. Forward or pulling movement of the pullings heads is provided by a chain drive 39. An appropriate interconnection (not shown) is provided between the chain drive 39 and chains 36' of the track section 36 so that both can be operated at the same speed. A portion 40 of the frame 30 mounts a flying cut-off saw 41 capable of being moved progressively longitudinally by conventional means at the same rate of travel as the stock so that as the stock is being cut off the cut-off saw 41 will be traveling at the same speed as the stock itself. A control panel 42 is provided to house the electrical and electro-hydraulic controls which are used to manipulate the entire operation.

As shown in somewhat greater detail in FIGS. 4 and 5, the extension 34 of the housing 33 is shown broken away to reveal the chamber 22 in which is located the jacket 23 containing the forming die 20. On the right side of the extension 34, as shown in FIG. 4, is a bracket 45 which mounts an optical pyrometer sensor 46. The sensor is one capable of adjustment so as to focus upon a point 47 which is the point of exit of the hardened stock 19' from the forming die.

Within the portion 35 of the frame there is shown a transverse sprocket 47' driven by the chain drive 39 which is the means for driving the chains 36' of the track section 36. An adjusting crank 48 mounted on the portion 35 of the frame and attached to the track section 36 can be used to elevate and lower the track section, attached by parallelogram links 49 to the frame in order to adjust the level of the track section to the location of the hardened stock 19' so that the start up pulling operation will be in precise alignment with the axis of the forming dies.

A hydraulic motor 50 is shown in the portion 40 of the frame connected by means of a chain drive 51 to a sprocket 52 whereby to drive the chain drive 39 which in turn provides for movement of the pulling heads 37 and 38.

For releasably interconnecting the chain drive with the respective pulling heads 37 and 38 there is provided for each a hydraulic cylinder 53 which manipualtes a catch 54 capable of interconnecting the lower portion of the respective pulling head with the upper reach of the chain drive 39. The pulling head 37 is shown interconnected and, as a consequence, acting to pull the hardened stock 19' in a direction from left to right as viewed in FIG. 5. The pulling head 38 is shown disconnected.

For returning the pulling head 38 to its initial position, indicated by the reference character 55, there is provided a hydraulic ram 56 attached at one end 57 to the frame portion 35. A piston 58 extending from the ram is attached to a bracket 59 on the lower part of the pulling head 38. By action of the ram 56 the pulling head 38 is pulled in a direction from right to left, as viewed in FIG. 5, when the catch 54 is in the released position shown in FIG. 5. By proper timing of appropriate controls in the hydraulic circuit which includes the ram 56 and cylinder 53, power to the ram 56 is discontinued when the pulling head 38 reaches the initial position 55 and power to the cylinder 53 is supplied whereby the catch 54 is re-engaged with the chain drive 39, so that the pulling head again begins to pull. It will be understood further that appropriate mechanism in the pulling head 38 causes the pulling head to release its grip on the hardened stock 19 when it is being returned and renews the grip when the pulling head again starts its pulling stroke. Similar mechanism is incorporated in the pulling head 37, which operates in the same fashion as the pulling head 38 but at alternate times.

THE COMPOSING TUBE

One embodiment of the composing tube 15 is shown in FIGS. 6 and 7 in somewhat greater detail. A passage 65 through the tube is substantially cylindrical throughout an appreciable portion of the length of the tube but is provided with an entrance end 66 flared outwardly so that the strands 16 approach the passage 65 in a progressively contracting direction. Circumferentially disposed around a throat 67 joining the passage 65 with the entrance end 66 is a series of pressure jets 68, each with an individual approach passage 69 feeding from the common resin supply line 14 from the reservoir 13. On those occasions where, for example, the stock is in the form of a solid rod 26 and appreciable impregnation should take place centrally, the composing tube may be provided with a torpedo 70 mounted centrally in the throat 67 on an appropriate streamline bracket 71. In the torpedo 70 is a chamber 72 around which is located a series of exit jets 73 located upstream relative to the pressure jets 68 and another series of exit jets 74 located downstream. An exit passage 75 may also be provided. An approach passage 76 communicates between the chamber 72 and a resin supply line 14' which may be supplied in turn either by the reservoir 13 or a different resin reservoir (not shown) where some different resin mix might be desired.

In order to introduce hardener into the resin at an advantageous location, there is provided a mixing chamber 77 adjacent the entrance end of the approach passages 69 so that the approach passages 69 are manifolded from the mixing chamber 77. Hardener is supplied to the mixing chamber 77 through the line 18 from the canister 17. Similarly, there is provided a mixing chamber 78 adjacent the entrance end of the approach passage 76 supplied by a line 18' with hardener.

On those occasions where relatively flat or strip stock, like the stock 28, or even angular sections like the stock 27, may be desired, a composing tube like the composing tube 78 may be used. In this form of device, a passage 79 having a substantially rectangular cross-section is employed. Bosses 80 and 81 provide for appropriate resin approach passages on respective sides and edges of the passage 79. A centrally located torpedo tube may be advantageously omitted. A flared section 82 provides for directing the strands into the entrance end of the passage 79 in a manner similar to that described in connection with FIG. 7. Inasmuch as the impregnated unhardened stock 19 when it emerges from the passage 79 is still soft, it can be redirected through a forming die having, for example, an angular passage therethrough so that although the uncured stock is initially in the form of a flat strip, it can be early bent to an angular configuration and cured in an angular configuration in an appropriately shaped forming die. Other shapes of stock can be similarly formed.

By having the pressure jets 68 located in the throat 67, as the materials pass through the passage 65, there is produced a venturi effect at the throat which tends to minimize any resistance to flow of the materials through the passage. This is of material assistance in speeding up the rate of flow of materials through the composing tube, which is made possible by a special rapid cure in the curing zone. Hardener may be injected into the manifolds 77 and 78 by a conventional metering device or proportioner capable of passing the liquid hardener into the system under a slight pressure. By appropriately locating the reservoir 13, a liquid pressure head can be established in the supply line 14 without need for employing a pump.

FORMING AND CURING

The forming die 20 and the jacket 23 which surrounds it are preferably made of an appropriate thermosetting synthetic plastic resin which is unresponsive to the energy wave form which is employed to cure the unhardened stock 19. Among acceptable materials is Teflon, which is substantially non-reactive. Consequently, the forming die 20 and its surrounding jacket 23 remain relatively cool even though in the presence of radio frequency waves of high intensity, such as are set up in the chamber 22, although there is some accumulation of heat due to the fact that the stock itself heats up as a result of application of the wave energy to it and passes heat by conduction to the surrounding forming die. As has been previously noted, even though resin matrix systems in liquid form have not been capable of being heated efficiently at lower frequencies, they are found to be rapidly responsive to heating by high frequency signals in the range of 50 to 100 megahertz in the radio frequency band and 950 to 5200 megahertz in the microwave band. The generating equipment for the frequencies needed has been developed through other sources and is currently avaliable on the market for installation into the operation. It is generated in the housing 33 previously made reference to and applied to the work in the extension 34 which is suitably shielded by means not disclosed herein so as to confine the energy to the point of application and prevent its escape to the exterior. Curing by frequencies in the ranges herein made reference to takes place extremely rapidly so that the stock can be passed through the forming die 20 at a rate of from about 3 feet per minute to about 10 feet per minute, depending upon the particular resin matrix systems employed and the particular type of stock section which is being formed.

FORMING DIE VIBRATION

Since the stock 19, as it emerges from the forming die 20, is completely hardened, an appreciable resistance to passage through the exit end of the forming die begins to be built up. To reduce the drag, the vibrator 24 is mounted at the exit end of the forming die. Inasmuch as it is advantageous to actually vibrate the forming die itself, the vibrator 24 may be screwthreaded by means of threads 85 to the forming die. By appropriate well-known means, vibrations at sonic or ultrasonic frequencies are induced in the vibrator 24, these vibrations being preferably in an axial or longitudinal direction. The vibrations are passed directly to the forming die 20 by physical contact in the embodiments of the invention illustrated in FIGS. 6 and 8, thereby to greatly improve the pull-through operation by preventing the forming of an adhesive bond at the interface of the composite stock and the forming die and to eliminate sloughing which would otherwise mar the exterior surface of the hardened stock 19.

It is also possible to make use of a liquid couple to transmit the vibratory energy into the cured stock. Whereas Teflon has a relatively low modulus/high resiliency which could to a degree dampen ultrasonic energy, the cured stock, having a modulus of elasticity in compression of from 4 to 15 times higher than Teflon, will transport ultrasonic vibrations upstream with greater effectiveness and efficiency.

As shown in FIG. 8, a vibrator 24' has a bore 86 larger in diameter than the stock 19' and forms an annular space 86'. Liquid resin is supplied to the space 86' through a feed hole 87, there being provided a seal 88 to close the space. The seal may fit loosely enough to permit a thin film of liquid resin to cover the exterior of the stock. The resin forms a liquid couple to transmit vibratory energy from the vibrator 24' to the hardened stock 19' itself. Vibrations set up in the stock in this fashion, travel upstream for the full length of the stock within the forming die 20 to ease the pull-through operation. When the liquid couple is resin, as in the example herein described, a double function results. In addition to the transmission of vibration by the annulus full of resin, the emerging cured stock is coated with a thin film of resin which serves as a lubricant and also provides a desirable finished appearance in the stock.

The vibrator 24 or 24', as the case may be, may be a piezo-electric or a magnetostrictive cylindrical transducer activated by an electric power supply 89. Since the transducer is of considerable mass and vibrated at a high rate, the threaded connection previously referred to is important to inhibit face bounce at the interface. In the structure of FIG. 6, where the critical curing zone for the stock is in excess of three to four inches upstream from the threads, a standing wave generated by the cylindrical transducer, having an amplitude of from 5⅛ to 5¼ inches induced into the adjacent forming die 20, is sufficient for the effect desired.

PULLING MECHANISM

The pulling heads 37 and 38 are mounted in tandem and operate in alternating sequence so that while one pulling head is returning to its initial position, the other pulling head is exerting a pulling force upon the stock. In point of fact, the return motion is relatively rapid to the extent that for a substantial portion of the time both pulling heads are simultaneously exerting a pulling force. The pulling heads are substantially identical in construction and accordingly a description will be provided of the details of one head only, namely the pulling head 37.

As shown particularly in FIGS. 9 and 10, the pulling head 37 is provided with an upper block 90 and a lower block 91. On the right side, as viewed in FIGS. 9 and 10, lugs 93 of the upper block 90 alternate with lugs 94 of the lower block 91. In the lugs are bores 95 in axial alignment and a shaft 96 at each end, each carrying a knob 97, is inserted in the respective bores and serves as a hinge or pivot shaft. On the opposite side is a similar arrangement of alternating upper and lower lugs 98 and 99 having aligned bores 100 extending therethrough into the opposite ends of which are inserted shafts 101 carrying knobs 102, the shafts 101 also serving as hinge or pivot shafts. On both sides the shafts are retained by a yieldable detent 103 so that the shafts can be pulled out on either one side or the other and the shaft on the opposite side employed as a hinge shaft to open up the upper block 90 relative to the lower block 91 in order to gain access to the interior for adjusting the stock to the puller head.

For guiding the puller head in its travel along the frame the lower block 91 is provided with a downward extension 104 on which are upper and lower rollers 105 and 106, respectively, which are adapted to roll along opposite edges of a rail 107, which is secured to the inside face of an angle section 108 which forms part of the frame 30. Extending below the central portion of the lower block 91 are left and righthand webs 110 and 111 which form a passage 112 therebetween through which the upper reach of the chain drive 39 extends. The catch 54, previously identified and described, is pivotally mounted upon the webs 110 and 111 by means of a pivot pin 113. The hydraulic cylinder 53 is secured to a bracket 114 on the bottom of the lower block 91 by means of a pivot pin 115. A piston 116 of the cylinder 53 is pivotally attached to a crank arm 117 of the catch 54 by means of a pivot pin 118. A bell crank extension 119 on the opposite side of the catch 54 is adapted to be extended by action of the cylinder 53 into the space between adjacent cross-links of the chain 39 and upwardly against a shoulder 120 provided by a plate 121 bolted to the underside of the lower block 91, as shown in FIG. 13. A space 122 is provided on the underside of the lower block 91 to accommodate the swing of the bell crank extension. Assuming travel of the puller head 37 to be from left to right as viewed in FIG. 13, when the bell crank extension 19 has been extended upwardly by action of the cylinder 53 to the position shown, a cross-link 123 of the chain drive 39 will move into engagement behind the bell crank extension 119, pressing against the extension and through it against the shoulder 120 whereby to lock the puller head 37 to the chain whereupon the puller head will travel at the same rate that the chain is moving. When the puller head reaches the end of its left to right, or forward, movement, the cylinder 53 will be actuated to disengage the catch 54 from the chain, moving it to the broken line position of FIG. 13, at which time the ram 56, then activated, returns the puller head 37 to initial position. The ram 56, previously described, is secured at its stationary end to a bracket 125 mounted upon an angular section 126 which forms part of the adjacent side of the frame 30, by means of a pivot pin 126. The piston 58 extending out of the ram 56 has its outer end pivotally attached to a bracket 127 by means of a pivot pin 128, the bracket in turn being part of the bracket 114 which is attached to the lower side of the lower block 91, as shown in FIG. 9. Equipped in this fashion, when the puller head 37 reaches the end of its pulling stroke and the catch 54 has been disengaged, the ram 56 is activated and draws the piston 58 into itself, thereby reversing movement of the puller head 37 whereby it moves in a direction from right to left, as viewed in FIGS. 5 and 13, to its initial position.

GRIPPING MEANS IN THE PULLER HEAD

The puller heads herein shown are adapted to grasp four separate pieces of stock 19'. Actual contact is made with upper sides of the stock by a stock engaging plate element 130. The stock engaging plate element 130 is made of an appropriate synthetic plastic resin or like material which is slightly yieldable and of softer consistency than the stock. The plate element 130 is secured to a back-up plate 131 bolted against filler plates 132 and 133 by means of bolts 134 to the upper block 90, as shown in FIG. 10. For engaging the opposite side of the stock, there are provided four identical stock engaging plungers 135. These plungers extend throughout the length of the pull head as shown in FIG. 13. Each plunger in turn has an enlarged section 136 which is vertically slidably received in a plunger recess 137 formed in a mounting block 138. A retaining plate 139 overlies all of the plungers and is provided with a suitable passage 140 for slidably receiving each of the plungers 135. The retaining plate provides an upper shoulder or spring keeper for a marcel spring 141 which is retained on its opposite side by a shoulder 142 at the top of the enlarged section 136, see FIG. 12.

Within the plunger recess 137 and below the enlarged section 136 of the plunger 135 is a tube 143 of expandable material, which forms a lifter for the plunger when the tube is inflated. A fitting 144, shown on the left side of FIG. 13, fastened to the lower block 91 is in communication with the interior of the sack 143 and is also connected to a hydraulic line 145. A plug 146 closes the opposite end of the tube 143. Sundry filler plates 146, 147, 148, and 149 are located in the lower block 91 which can be varied together with the filler plates in the upper block in order to vertically align the space between the stock engaging plate element and plungers precisely with the center line of the stock 19'.

When the puller head 37 is in initial position at the beginning of its pulling stroke and the catch 54 is about to be engaged with the chain drive 39, by appropriate automatic means in a hydraulic circuit, hydraulic pressure is applied through the hydraulic line 145 to the tube 143 in each instance. This inflates the tube from the position of FIG. 11 to the position of FIG. 10. When the tube is inflated, the enlarged section 136 of the plunger 135 moves upwardly against tension in the marcel spring 141 until the top of the plunger 135 is forced against the stock 19' and presses it upwardly against the stock engaging plate element 130. This takes place simultaneously for each of the four plungers. By making the plungers 135 also of material relatively softer than the material of the stock 19', but sufficiently tough and resilient, the stock 19' is squeezed by them through a substantial portion of its length. Considerable gripping area is provided when the plunger is pushed hard enough against the stock to cause slight depression in the engaging surfaces. Additional surface engagement can be assured by dishing the tops of the plungers 135. The tube in each instance remains inflated under pressure as the puller head travels for the full extent of its stroke. At about the time when the catch 54 is to be released, hydraulic pressure in the tube is released, at which time the marcel springs push the plungers downwardly away from engagement with the stock 19', causing the respective tube 143 to be collapsed. In this manner a grip upon the stock is released, simultaneously for all four plungers, and the puller head is then removed backwardly, as previously described, by action of the ram 56 free of engagement and contact with the stock.

To further improve the effectiveness of the puller heads there are provided at both ends of each puller head rotating guide sleeves, like the guide sleeves 150 shown in FIG. 9. Mounting blocks 151 mount the guide sleeves on a cross-bar 152 supported by a bracket 153. Knurled screws 154 on the blocks 151 can be loosened or tightened as needed in order to shift the guide sleeves transversely so that they snugly accommodate the stock 19' in the manner shown in FIG. 9. An adequate number of guide sleeves are provided to accommodate four lengths of stock 19' in the embodiment shown. They may be shifted sideways where the stock is larger or smaller in diameter or where it assumes different shapes.

The present invention is adapted primarily to be actuated by a hydraulic circuit interconnected with the hydraulic motor 50 which drives the chain drive. By providing a conventional closed loop electrical control, the optical pyrometer sensor 46 acting through suitable mechanism in the control panel 42 serves to speed up or slow down operation of the hydraulic motor 50. If, for example, the stock is coming out too hot, the motor can be speeded up slightly. Should the temperature become too low resulting in a delayed proper curing, the pyrometer acting as before in reverse direction serves to slow down the hydraulic motor 50 which retards the rate of passage of the stock through the curing zone until a proper curing temperature is resumed.

In a closed loop control of the type referred to above a manually set automatic speed adjusting device 160 may be installed in the control panel 42 and may be used instead of the pyrometer sensor 46. The adjusting device may be one of a commercially available type and installed in the closed loop control including the hydraulic motor so as to accurately set and constantly maintain the speed of pull-through.

By having virtually all of the remaining mechanism interconnected in a common hydraulic circuit, and by the use of suitable electrically actuated valving, the sequence of operation of all of the hydraulic motivation can be set and controlled electrically so that the entire operation is continuous as long as power is left on and the supply of raw materials remains adequate. Further by introducing hardener to the resin at the composing tube, there is no batching of resin needed and hence no batch life to contend with. Saturation of the strands of roving does not take place until a point where the resin and hardener are mixed, and this saturation is followed immediately by an accelerated curing in the manner described. Should the operation be inadvertently interrupted for any reason which might result in the stock becoming hardened too soon in the composing tube, for example, little or no material is lost, since supply of resin, hardener and roving can be immediately cut off and started again through a replacement composing tube. When occasion arises for change in the character of the composing tube, this is easily accomplished by merely cutting off the supply of roving, resin and hardener similarly, one composing tube removed and immediately cleansed, and replaced by another composing tube giving a desired different type of section for the stock.

While the invention has herein been shown and described in what is conceived to be a practical and effective embodiment, it is recognized that departures may be made therefrom within the scope of the invention, which is not to be limited to the details disclosed herein.

Having described the invention, what is claimed as new in support of Letters Patent is:

1. A machine for continuously composing and forming elongated sections of stock of fiber reinforced synthetic plastic resin comprising:
   a frame, a composing tube on said frame, a reservoir of liquid resin adjacent said frame, a stock of individual strands of fiber filaments adjacent said frame, and pulling means mounted on said frame adjacent one end thereof for endwise reciprocating travel, said composing tube having an entrance end and an exit end and a supply connection intermediate said ends open to said reservoir, means in communication with said connection for introducing a hardener into said resin while in transit forming a mixture and a passage through said composing tube intermediate said ends for said filaments, said passage and said connection being in communication with each other at a location within said tube whereby to impregnate said filaments with said mixture in transit, a curing zone for said stock adjacent an exit end of said tube, said pulling means being adapted to engage said stock at a location downstream of said curing zone and draw said stock from said composing tube and said curing zone.

2. A machine for continuously composing and forming elongated sections of stock according to claim 1 wherein: said entrance and exit ends are in axial alignment, a throat intermediate said ends having a stock confining interior surface and a series of circumferentially spaced pressure jets around and opening into said throat, said jets being in communication with said reservoir.

3. A machine for continuously composing and forming elongated sections of stock according to claim 2 wherein:
   the entrance end has a flared entrance passage of progressively diminishing diameter in a downstream direction and in the area where said jets are located whereby to deflect said filaments inwardly.

4. A machine for continuously composing and forming elongated sections of stock according to claim 3 wherein: said first identified jets are immediately adjacent the innermost end of said entrance passage.

5. A machine for continuously composing and forming elongated sections of stock according to claim 2 wherein: said jets have approach passages sloping inwardly and downstream from the entrance end.

6. A machine for continuously composing and forming elongated sections of stock according to claim 1 wherein: there is a high frequency wave energy curing zone for said stock located downstream of said composing tube.

7. A machine for continuously composing and forming elongated sections of stock according to claim 1 wherein: there is a forming die located downstream of said composing tube and a vibration generating device in operating communication with said forming die productive of vibratory energy upon the stock at a location where it is impregnated with said resin and subject to formation and curing.

8. A machine for continuously composing and forming elongated sections of stock according to claim 7 wherein: said vibratory wave energy device is mounted in a direction productive of application of energy generated therein axially relative to said forming die.

9. A machine for continuously composing and forming elongated sections of stock according to claim 1 wherein: said pulling means comprises a plurality of pulling heads mounted on said frame in spaced axial alignment and having an axially reciprocating drive so that when one head is in pulling engagement with the stock another head is free of engagement and returning to a start position.

10. A machine for continuously composing and forming elongated sections of stock according to claim 9 wherein:
each said pulling head comprises upper and lower blocks, a stock engaging element on one of said blocks, a stock engaging plunger in the other of said blocks, a drive for said plunger comprising an expandable tube in communication with a controlled source of fluid under pressure, a continuous drive means on said frame having parts moving in opposite axial directions relative to said stock, and an intermittent engagement between said head and said drive means whereby when said plunger is in engagement with said stock the head is in pulling engagement with the drive means and when the plunger is out of engagement with said stock the head is in return engagement with the drive means.

11. A machine for continuously composing and forming elongated sections of stock according to claim 1 wherein:
said pulling means comprises a stock engaging means and a plunger in operable engagement therewith, said stock engaging means and said plunger being of material softer than the stock and in engagement with said stock for a linear distance many times the cross-sectional dimension of said stock.

12. A machine for continuously composing and forming elongated sections of stock of fiber reinforced synthetic plastic resin comprising:
a frame, a composing tube intermediate opposite ends of said frame, a first supply of liquid resin adjacent said frame, a second supply of liquid resin adjacent said frame, a stock of individual strands of fiber filaments adjacent said frame, and pulling means mounted on said frame adjacent one end thereof for endwise reciprocating travel, said composing tube having an entrance end and an exit end, a first supply connection intermediate said ends open to said first supply, a second supply connection intermediate said ends open to said second supply, means in communication with said connections for introducing a hardener into said resins while in transit, forming a mixture and a passage through the composing tube from said entrance end to said exit end for said filaments, said passage and said connections being in communication with each other at a location within said tube and intermediate the ends thereof whereby to impregnate said filaments with said mixture in transit and form a saturated stock, a curing zone for stock adjacent the exit end of said tube, said pulling means being adapted to engage said stock at a location downstream of said curing zone and draw stock from said composing tube and said curing zone.

13. A machine for continuously composing and forming elongated sections of stock of fiber reinforced synthetic plastic resin comprising:
a frame, a composing tube intermediate opposite ends of said frame, a first supply of liquid resin adjacent said frame, a second supply of liquid resin adjacent said frame, a stock of individual strands of fiber filaments adjacent said frame, and pulling means mounted on said frame adjacent one end thereof for endwise reciprocating travel, said composing tube having a first supply connection open to said first supply, a second supply connection open to said second supply, means in communication with said connections for introducing a hardener into said resins while in transit, and a passage therethrough for said filaments, said passage and said connections being in communication with each other at a location within said tube whereby to impregnate said filaments with said resins in transit, a curing zone for said stock adjacent an exit end of said tube, said pulling means being adapted to engage said stock at a location downstream of said curing zone and draw said stock from said composing tube and said curing zone,
the passageway through said composing tube including an entrance end, an exit end in axial alignment with the entrance end, a throat intermediate said ends and a series of circumferentially spaced pressure jets around and opening into said throat, said jets being in communication with said first supply, a torpedo tube member mounted centrally within said throat and spaced from the walls thereof, said torpedo tube member having a chamber therein in communication with said second supply, and exit jets from said chamber opening into said throat at a location adjacent said first identified jets, said torpedo tube forming an annular space for reception of said filaments and for saturation of said filaments with a mixture of said resins.

14. A machine for continuously composing and forming elongated sections of stock according to claim 13 wherein:
said exit jets are located both upstream and downstream of said first identified jets.

15. A machine for continuously composing and forming elongated sections of stock of fiber reinforced synthetic plastic resin comprising:
a frame, a composing tube intermediate opposite ends of said frame, a reservoir of liquid resin adjacent said frame, a stock of individual strands of fiber filaments adjacent said frame, and pulling means mounted on said frame adjacent one end thereof for endwise reciprocating travel, said composing tube having a supply connection open to said reservoir, means in communication with said connection for introducing a hardener into said resin while in transit, and a passage therethrough for said filaments, said passage and said connection being in communication with each other at a location within said tube whereby to impregnate said filaments with said resin in transit, a curing zone for said stock adjacent an exit end of said tube, said pulling means being adapted to engage said stock at a location downstream of said curing zone and draw said stock from said composing tube and said curing zone,
a forming die located downstream of said composing tube and a vibration generating device in operating communication with said forming die productive of vibratory energy upon the stock during formation thereof,
the vibration generating device being in the form of a tubular case secured to the downstream end of said forming die there being an annular space between the inside wall of said tubular case and the stock and a passage through the wall of said tubular case in communication with said annular space for a vibration transmitting liquid.

16. A machine as defined in claim 15 including a loose fitting seal at the exit end of said annular space whereby to effect a coating of said liquid around stock emerging from said annular space.

17. A machine for continuously composing and forming elongated sections of stock of fiber reinforced synthetic plastic resin comprising:
a frame, a composing tube intermediate opposite ends of said frame, a reservoir of liquid resin adjacent said frame, a stock of individual strands of fiber filaments adjacent said frame, and pulling means mounted on said frame adjacent one end thereof for endwise reciprocating travel, said composing tube having a supply connection open to said reservoir, means in communication with said connection for introducing a hardener into said resin while in transit, and a passage therethrough for said filaments, said passage and said connection being in communication with each other at a location within said tube whereby to impregnate said filaments with said resin in transit, a curing zone for said stock adjacent an exit end of said tube, said pulling means being adapted to engage said stock at a location downstream of said curing zone and draw said stock from said composing tube and said curing zone, a pyrometer sensor responsive to the temperature of the stock emerging from the curing zone, a preset temperature control, a variable speed electrohydraulic drive for said pulling means, a source of electric power and a circuit interconnecting said source of power, said electrohydraulic drive, said preset temperature control and said sensor whereby when the temperature of the stock is too high the speed of said drive is speeded up and when the temperature of said stock is too low the speed of said drive is slowed down whereby to insure an optimum curing temperature at a corresponding optimum rate of travel of said stock.

18. A machine for continuously composing and forming elongated sections of stock of fiber reinforced synthetic plastic resin comprising:

a frame, a composing tube intermediate opposite ends of said frame, a reservoir of liquid resin adjacent said frame, a stock of individual strands of fiber filaments adjacent said frame, and pulling means mounted on said frame adjacent one end thereof for endwise reciprocating travel, said composing tube having a supply connection open to said reservoir, means in communicaation with said connection for introducing a hardener into said resin while in transit, and a passage therethrough for said filaments, said passage and said connection being in communication with each other at a location within said tube whereby to impregnate said filaments with said resin in transit, a curing zone for said stock adjacent an exit end of said tube, said pulling means being adapted to engage said stock at a location downstream of said curing zone and draw said stock from said composing tube and said curing zone, a manually set automatic speed adjusting and maintaining device, a variable speed electrohydraulic drive for said pulling means, a source of electric power and a circuit interconnecting said source of power, said electrohydraulic drive and said speed adjusting and maintaining device, whereby to accurately set and constantly maintain the rate of travel of said stock.

References Cited

UNITED STATES PATENTS

| | | | |
|---|---|---|---|
| 2,871,911 | 2/1959 | Goldsworthy et al. | 156—441 |
| 3,095,343 | 6/1963 | Berger | 156—441 |
| 3,146,141 | 8/1964 | Woodland | 156—273 |
| 2,732,883 | 1/1956 | Morrison et al. | 156—180 |
| 2,775,860 | 1/1957 | Morrison | 156—180 |
| 2,948,649 | 8/1960 | Pancherz | 156—180 |
| 3,131,104 | 4/1964 | Korn | 156—579 |
| 3,021,243 | 2/1962 | Berthge | 156—330 |

BENJAMIN A. BORCHELT, Primary Examiner

H. J. TUDOR, Assistant Examiner

U.S. Cl. X.R.

156—180, 380